United States Patent
Moate et al.

(10) Patent No.: US 8,938,130 B2
(45) Date of Patent: Jan. 20, 2015

(54) ALIGNMENT OF SYNTHETIC APERTURE IMAGES

(75) Inventors: Christopher Paul Moate, Malvern (GB); Keith Derek Copsey, Malvern (GB)

(73) Assignee: Qinetiq Limited, Hampshire (GB)

(*) Notice: Subject to any disclaimer, the term of this patent is extended or adjusted under 35 U.S.C. 154(b) by 44 days.

(21) Appl. No.: 13/813,732

(22) PCT Filed: Jul. 25, 2011

(86) PCT No.: PCT/GB2011/001107
§ 371 (c)(1), (2), (4) Date: Feb. 1, 2013

(87) PCT Pub. No.: WO2012/017187
PCT Pub. Date: Feb. 9, 2012

(65) Prior Publication Data
US 2013/0129253 A1    May 23, 2013

(30) Foreign Application Priority Data
Aug. 6, 2010 (GB) .................................. 1013269.4

(51) Int. Cl.
*G06K 9/00* (2006.01)
*G06K 9/64* (2006.01)
(Continued)

(52) U.S. Cl.
CPC ............... *G06T 3/0075* (2013.01); *G01S 13/90* (2013.01); *G06T 3/0068* (2013.01)
USPC ............ 382/278; 382/128; 382/299; 382/300

(58) Field of Classification Search
CPC ........................................................ G06T 7/003
See application file for complete search history.

(56) References Cited

U.S. PATENT DOCUMENTS 4,999,635 A * 3/1991 Niho .......................... 342/25 D
5,623,560 A    4/1997 Nakajima et al.
(Continued)

FOREIGN PATENT DOCUMENTS

WO    WO 00/54223 A1    9/2000
WO    WO 2008/079301 A2    7/2008

OTHER PUBLICATIONS

Peterson, E. H.; Fotopoulos, G.; Schmitt, A.; Zee, R. E.; Roth, A., "Registration of multi-frequency SAR imagery using phase correlation methods," Geoscience and Remote Sensing Symposium (IGARSS), 2011 IEEE International, vol., no., pp. 3708,3711, Jul. 24-29, 2011.*

(Continued)

*Primary Examiner* — Andrae S Allison
(74) *Attorney, Agent, or Firm* — Oliff PLC

(57) ABSTRACT

A method for the alignment of pairs of complex images of a region, such as may be produced by separate passes of a synthetic aperture radar, is disclosed. The method selects a subset of each image in the form of a plurality of tiles, and calculates a correlation value between corresponding pairs of tiles. Shifts in x and y for each pair where the correlation value exceeds a threshold are then used to calculate values for overall shift, stretch and shear to be applied to one of the images to align it with the other. An iterative least squares approach may be used. As both phase and amplitude information is used in the correlation the technique is suitable for aligning images having little intensity variation. The invention may be used to align images prior to coherent change detection analysis of the images.

11 Claims, 5 Drawing Sheets

Figure 1:
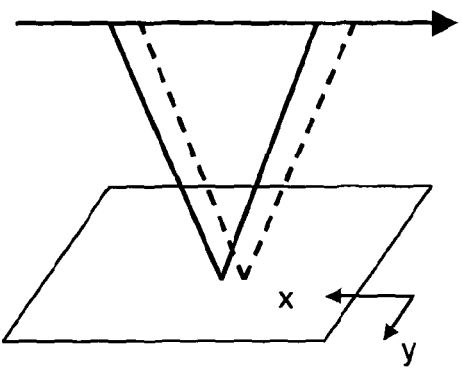
Figure 1:
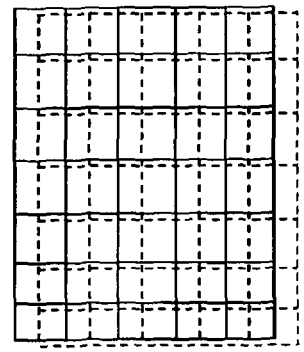
Figure 1:
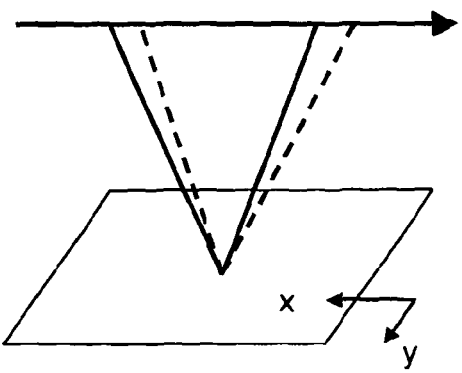
Figure 1:
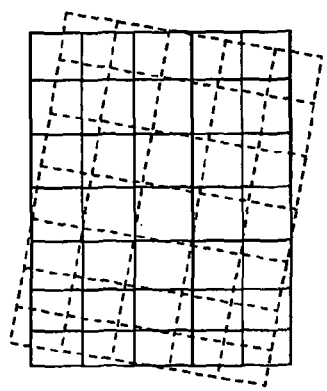
Figure 1:
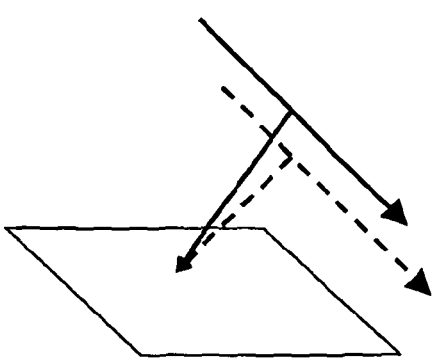
Figure 1:
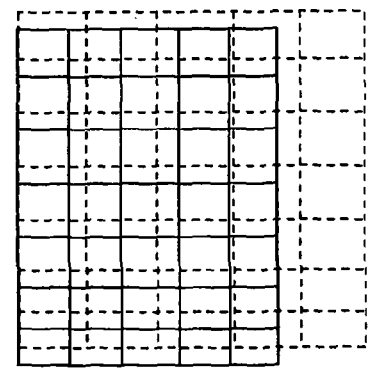

(51) Int. Cl.
*G06K 9/32* (2006.01)
*G06T 3/00* (2006.01)
*G01S 13/90* (2006.01)

(56) References Cited

U.S. PATENT DOCUMENTS

| | | | |
|---|---|---|---|
| 6,519,372 B1* | 2/2003 | Eppler et al. | 382/294 |
| 2004/0013299 A1* | 1/2004 | Crosby | 382/168 |
| 2009/0154832 A1* | 6/2009 | Pham | 382/280 |
| 2010/0007549 A1 | 1/2010 | Smith | |
| 2010/0008598 A1* | 1/2010 | Riley et al. | 382/299 |

OTHER PUBLICATIONS

Kumar et al, Robust Image Registration Technique for SAR Images, First International Conference on Industrial and Information Systems, ICIIS 2006, Aug. 8-11, 2006, Sri Lanka.*

Daniel S. McFarlin, Franz Franchetti, Markus P'uschel, and Jos'e M. F. "High Performance Synthetic Aperture Radar Image Formation on Commodity Multicore Architectures," Proceeding of the SPIE, vol. 7337, 2009.*

Zhi et al, A New Registration of Interferometric SAR: Least Squares Registration, Asian Conference on Remote Sensing, Singapore Nov. 2001.*

Wiley, "A Paradigm for Technology Evolution," *Synthetic Aperture Radars,* vol. AES-21, No. 3, pp. 440-443, May 1985.

Nov. 18, 2011 International Search Report issued in International Patent Application No. PCT/GB2011/001107.

Nov. 18, 2011 Written Opinion of the International Searching Authority issued in International Patent Application No. PCT/GB2011/001107.

Jan. 10, 2011 British Search Report issued in British Patent Application No. GB1013269.4.

* cited by examiner a)

b)

c)

d)

e)

f)

ALIGNMENT OF SYNTHETIC APERTURE IMAGES

This invention relates to the processing of images that may be produced by a synthetic aperture system such as a synthetic aperture radar (SAR). More particularly, it relates to the alignment of coherent SAR images recorded at different times, and from different positions. The invention has utility beyond the matching of synthetic aperture based images however, in that it provides an efficient means for the aligning of complex (i.e. containing magnitude and phase information) images in general, where the alignment comprises of rotation, stretch, shear, and/or shift steps.

Synthetic aperture radar systems are known, and have been used for many years to generate high resolution images of the ground. The synthetic aperture is produced by recording a series of radar returns taken from a moving platform over a period of time, applying a phase correction factor to each one that corrects for the platform movement, and integrating them over the time period. Images may be generated from the processed returns that have an equivalent resolution dependent upon the aperture size, i.e. the distance moved by the platform over the time period, or by the aperture beamwidth for certain systems. Wiley, C A, "Synthetic Aperture Radars", IEEE Trns. Aerospace & Electronic Systems, Vol. AES-21, No. 3, May 1985, pp 440-443 describes SAR systems in more detail.

SAR systems usually operate in one of two modes of operation. These are called strip-map mode, and spotlight mode. In stripmap mode the antenna pointing is fixed relative to the flight path providing an area of illumination that sweeps along a strip of terrain. In spotlight mode the sensor steers the antenna to continuously illuminate an area of interest allowing a smaller area to be imaged at higher resolution.

The latter approach also provides, for a single pass of the moving platform, a set of images of the same region, albeit that each are from a different aspect, whereas a plurality of different passes are needed to produce multiple images of the same region using the former, strip-map, approach. Of course, images may be recorded from the same region during different passes using the spotlight method also.

With each approach therefore a set of images of a region of interest may be built up. By comparing two images of the same region, taken at different times and looking for differences between them, changes in the scene, such as may be caused by moving targets can be identified. Various ways of doing this are known.

The most simple is known as incoherent change detection (ICD), and uses changes in image intensity for detecting changes in the interval between the collection of two SAR images of the same region. As the technique operates on intensity information then complex image data (i.e. phase information) is not required.

Another technique is known as coherent change detection (CCD). This technique exploits changes in both the amplitude and phase content between image pairs (i.e. images of the same scene taken at different times). It relies on the image generation process being coherent, wherein each pixel of the image contains an amplitude and a phase, or alternatively a real and imaginary value. As the phase is measured in fractions of a wavelength of the radar signal, which may typically be at 10 GHz, equivalent to a wavelength of 3 cm, CCD has the potential to detect very subtle scene changes that may remain undetected using incoherent techniques.

When comparing images taken of the same region at different times using the above techniques it will be apparent that image registration is important, so that like pixels, i.e. pixels representing the same area on the ground, are being compared. Clearly, this is much more critical for CCD images, where finer alignment of the images to within a small fraction of a resolution cell is desirable. The task is made more difficult due to the very large size of many SAR images. Typically a single spotlight SAR image can be up to 15 km by 15 km, and a stripmap image can be hundreds of kilometres long and several kilometres wide, with pixels sizes of 30 cm by 30 cm. The processing power and storage needed for manipulating such images is therefore significant.

Techniques exist for aligning image pairs, so allowing either a CCD or ICD image to be generated. "Coherent Change Detection: Theoretical Description and Experimental Results", by Mark Preiss and Nicholas J. S. Stacy, Intelligence, Surveillance and Reconnaissance Division, Defense Science and Technology Organisation, DSTO-TR-1851, discusses image registration for complex SAR images.

For CCD images the level of alignment should be to within a fraction, such as a quarter, an eighth, a tenth, or a sixteenth of a resolution cell. The reference above states that an alignment of a tenth of a resolution cell is necessary for high quality results. Clearly, the more closely aligned the images the better the resulting CCD image will be, but useable imagery may be obtained with alignments of lower accuracy.

An object of the present invention is to provide an alternative technique for minimising small errors in alignment when generating a CCD image.

According to the present invention there is provided a method for precisely aligning images of a scene, the images being complex images containing both magnitude and phase information, and comprising a first image and a second image of a region, the method comprising the steps of:
  a) dividing the first image into a plurality of tiles, the sum total area of the tiles being less than the area of the first image;
  b) dividing the second image into a plurality of tiles, each tile corresponding in position to a tile of the first image;
  c) up-sampling each of the tiles to increase the effective tile resolution;
  d) for each up-sampled tile in the first image, determining, using a complex correlation algorithm, an offset in x and y between it and the corresponding up-sampled tile from the second image (together constituting a tile pair), the offset being one that maximises a complex correlation between the two tiles;
  e) using the offsets calculated to produce overall image movement parameters for the second image; and
  f) applying the overall image movement parameters to the second image, thereby aligning it with the first image.

The invention provides a means for aligning very large complex images using a relatively modest amount of computing power. SAR images may be many tens or even hundreds of thousands of pixels in each dimension, and using a standard correlation alignment technique is completely impractical. By using relatively small subsets of the image (such as 10%, 1% or 0.1%), taken from different parts thereof, and carrying out a complex correlation, a good alignment can be achieved with much less computing power than would otherwise be achieved. As a complex correlation is being used (i.e. a correlation that includes phase information present in the SAR images), then image tiles with relatively little visual structure, such as plains etc. still are able to give good correlation peaks when the best alignment is achieved.

The tiles are preferably taken from points across the whole of the image, so as to get representative offsets from the image as a whole. The tiles need not be contiguous, and do not, in their entirety, cover the whole image. The tiles taken from the two images may be similar in size, or may differ in size. For example a tile from the second image may be larger in area than the corresponding tile in the first image.

The tile locations may be uniformly spread throughout the image, or may alternatively be taken from areas where image detail is greatest, to increase a likely correlation value. Other tile location selection criteria may be used, such as random selection. The tiles, once selected, may be up-sampled, to improve ultimate registration accuracy. The tiles may be upsampled to a degree depending upon the required registration accuracy. Typically a linear factor 4 may be used, with the additional samples set to zero, but 2, 8 or 16 or other factors may be used as appropriate. The upsampling process is known, and will not be described further.

The correlation may be carried out in any suitable manner. A part of one tile from one image may be correlated against the whole of the corresponding tile from the other image. A mask may be used to select a part of a tile to be used in the correlation process.

The correlation performed on the two tiles is preferably an FFT based correlation due to its computational efficiency, although other correlation algorithms may be used. A normalisation process may be carried out on the correlation. The normalisation may be a local normalisation, in that it uses data only from tiles being correlated, rather than the whole image. The effect of the normalisation is to allow the matching of the first tile to the second to be calculated in FFT time while avoiding errors caused by edge wrapping.

The result of the correlation process from each of the tile pairs is a peak in coherence at a particular x and y shift that gives the best alignment. If the peak value is below a predetermined threshold, then the results from that particular tile pair is rejected, as it is likely to contain too high a noise level. The threshold may be ascertained empirically.

The x and y shifts obtained from each tile in which the correlation threshold is reached are used to generate movement parameters that, when applied to one of the images, best aligns it with the other image. The movement parameters may be at least one of shift, shear and stretch, and may typically comprise all three The values may be applied to the first or second image as desired. The values may be determined by known methods, such as using a minimum squared error (MSE), or least squares, approach to produce a best fit. An iterative approach may be adopted wherein, should the error between the individual data points and the best fit be above a predetermined threshold then the data points having the most significant error may be removed, and the best fit recalculated. This process may be continued until the error is within acceptable limits.

According to a second aspect of the invention there is provided a computer program comprising instructions arranged to run on a computer system, the system comprising at least a processor and memory, the steps of the computer program being arranged to process data corresponding to first and second complex images of a region, by
  a) dividing the first image into a plurality of tiles, the sum total area of the tiles being less than the area of the first image;
  b) dividing the second image into a plurality of tiles, each tile corresponding in position to a tile of the first image;
  c) up-sampling each of the tiles to increase the effective tile resolution;
  d) for each up-sampled tile in the first image, determining, using a complex correlation algorithm, an offset in x and y between it and the corresponding up-sampled tile from the second image (together constituting a tile pair), the offset being one that maximises a complex correlation between the two tiles;
  e) using the offsets calculated to produce overall image movement parameters for the second image; and
  f) applying the overall image movement parameters to the second image, thereby aligning it with the first image.

Figure 2:
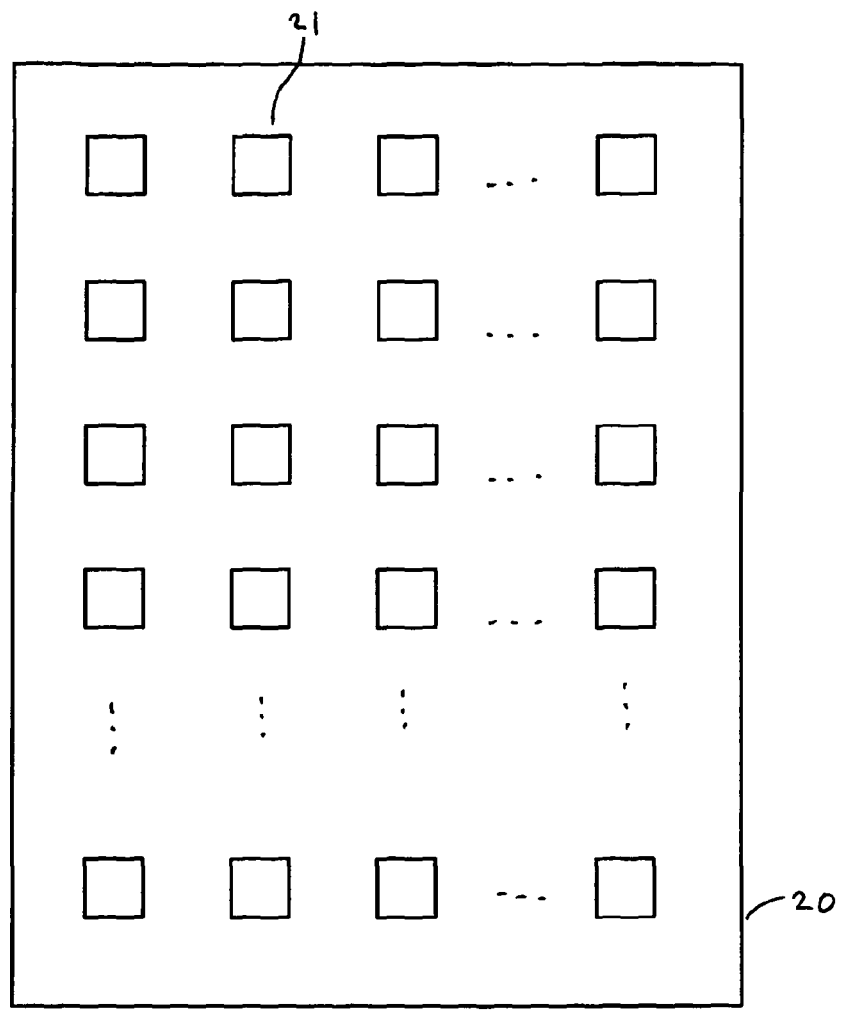
Figure 3:
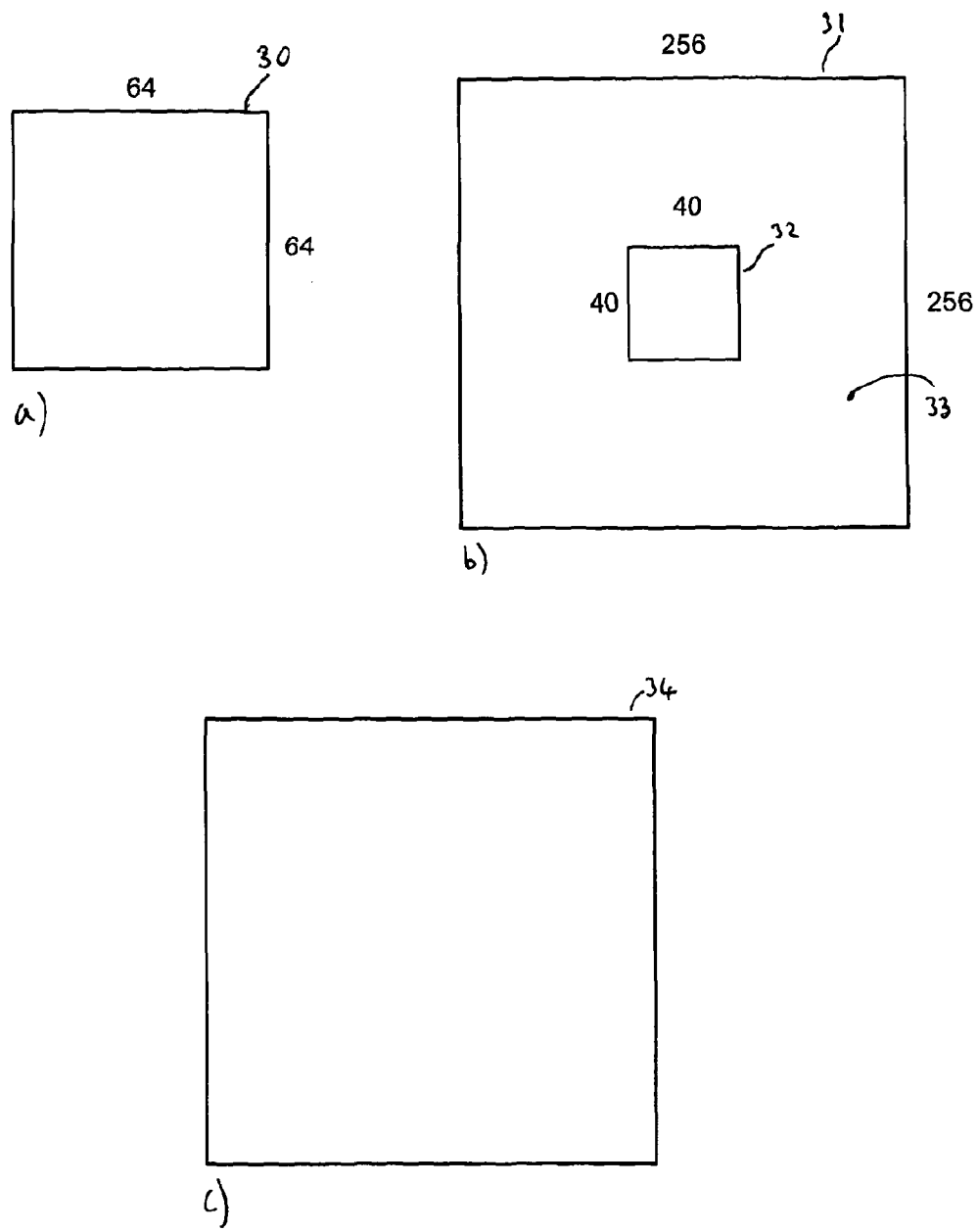
Figure 4:
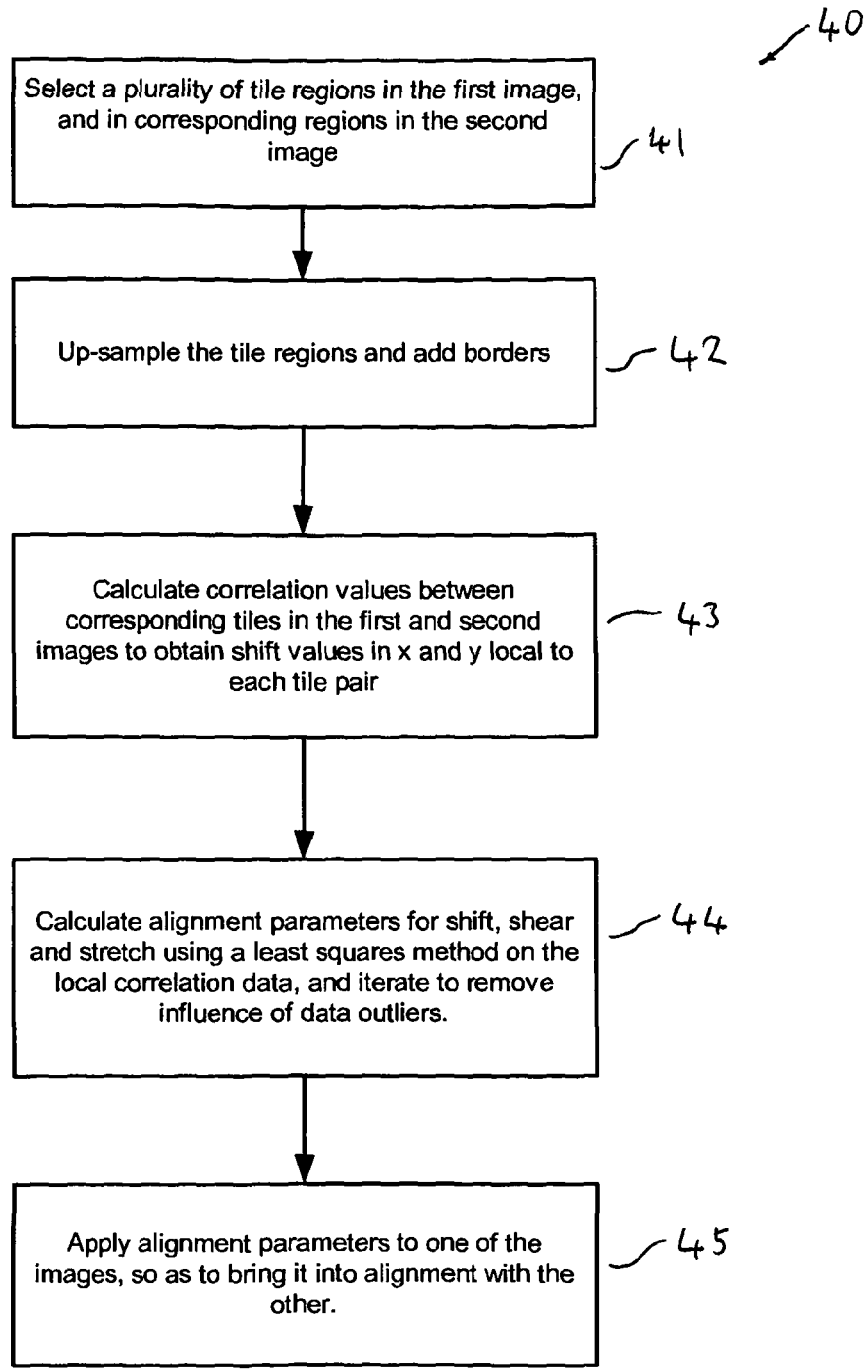
Figure 5:
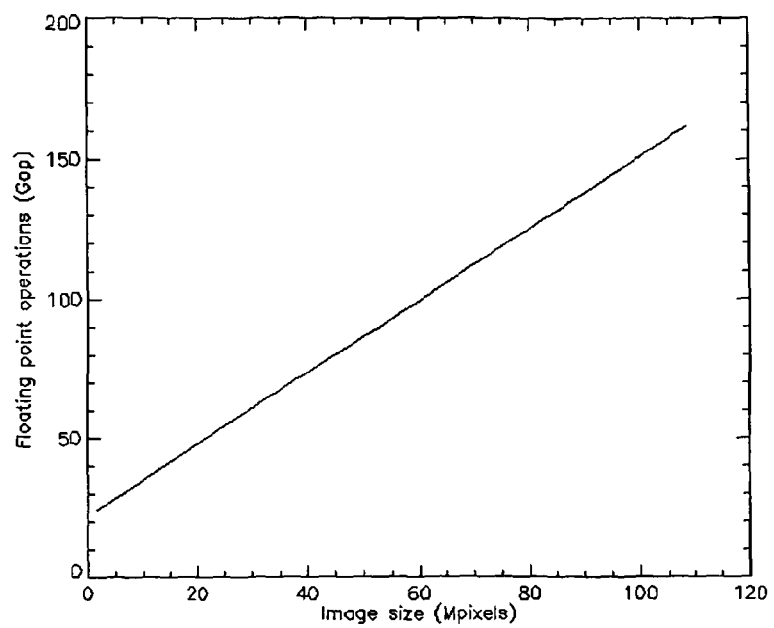

The invention will now be described in more detail, by way of example only, with reference to the following Figures, of which:

FIG. 1 diagrammatically illustrates typical misalignments that may exist between two images;

FIG. 2 diagrammatically illustrates a typical selection of tiles from an image to be aligned;

FIG. 3 diagrammatically illustrates some of the processing of the first and second tiles;

FIG. 4 shows a block diagram, in high level form, of an embodiment of the present invention; and FIG. 5 shows a graph of computation time against image size for an embodiment of the present invention.

FIG. 1 shows examples of misalignments that can occur between two SAR images of a region recorded from a moving platform at different times. FIG. 1a shows a region (1) being imaged by an aircraft carrying a SAR radar. The path followed by the aircraft in both a first and a second pass is shown by arrow (2). Solid lines (3, 4) show the position of the aperture in space in the first pass, whereas dotted lines (5, 6) show the position of the aperture in space during the second pass. The difference between the two means, in this instance, that the region imaged in the second pass is offset slightly from that in the first pass. This is shown in FIG. 1b. The solid grid shows the region imaged in the first pass, and the dotted grid is that imaged in the second pass. A horizontal offset can be seen, that is uniform across the whole extent of the image. This misalignment is therefore known as a shift. Note that the slight vertical shift is, in this instance included for image clarity purposes, but of course in practice the shift can occur in both the horizontal and vertical axes.

FIG. 1c shows a further misalignment that may occur. The trajectory, aperture and region being imaged are all as in FIG. 1a. Again, there is a slight difference in the position of the aperture in space between the two passes. However, the SAR radar's antenna points at the same point on the ground in each pass. The result of the misalignment upon the image can be seen in FIG. 1d. Again the solid grid is that from the first pass, and the dotted grid is from the second pass. The error here is a rotation. For small errors a rotation can be approximated by a shear which is effectively an offset in one axis dependent upon the position of the other axis, and which is much more efficient to implement in terms of processor time.

FIG. 1e shows the cause of a further misalignment, this being a stretch. The solid lines represent the trajectory and look direction of a first pass, and the dotted lines represent the same but of a second pass. The dotted line is below that of the solid line. This is therefore representative of the aircraft carrying the SAR system flying its two passes at different heights, creating a difference in grazing angle. FIG. 1f shows the effect of stretch on the image, with the second pass (dotted grid) being stretched, as compared to the first pass (solid grid). This is equivalent to the axis being multiplied, or scaled, by a factor greater than 1. Of course, if the grazing angles had been reversed then the effective multiplication would have been by a factor less than 1, and would have been shrinkage. Both effects are termed stretch herein. The stretch can be linear or non-linear—i.e. the amount of stretch can differ across the image.

FIGS. 2 and 3 show detail of some of the steps used in an embodiment of the present invention. A block diagram (40) of the method used in this embodiment is shown in FIG. 4. The embodiment comprises a method that takes as inputs two complex SAR images that need to be aligned to a sufficient degree to be suitable for CCD. The images will already have at least a rough alignment with each other.

A first step (41) is to select tile regions within each image. FIG. 2 shows how a typical selection of tiles may be made from an image to be aligned in an embodiment of the present invention. Image (20), which may represent either the first or the second image, is shown with an array of tiles (e.g. 21) regularly spaced within it. The Figure is schematically representative in terms of showing the regularity of the array of locations that are chosen. The embodiment does however use 400 tiles, distributed throughout each image, where each image can be of the order several kilometers square and contain many thousands of pixels. Each tile initially comprises 64×64 pixels of data from its corresponding image, although it will be appreciated that different tile sizes and spacings may be used without departing from the invention. The total area of the tiles account for approximately 1.6% of the total image area in the embodiment. The tiles are each up-sampled by a linear factor 4 in conventional manner by padding with zeroes and applying an FFT. The number of tiles of a given size (or alternatively the size of the area of the image chosen to use in the correlation process) will affect both the computation time and the accuracy of the final alignment More tiles mean a higher computation time, but will result in a better overall alignment accuracy, and hence fewer tiles allow for quicker computation time at the expense of a compromise in alignment accuracy. The tile size selection is also limited by the degree to which the first and second images are already in alignment. The greater the degree of initial misalignment then the larger the tiles will have to be, as the correlation step discussed below is more efficient if large areas of the tiles being correlated relate to the same region of ground. Different embodiments of the invention may choose the size and number of tiles depending upon the accuracy required, and the computation power available.

The tiles (e.g. 21) may be spaced uniformly about the image, as shown. Alternatively the tiles may be taken from random locations throughout the image.

The tiles from the second image are taken from points corresponding to the tile locations on the first image, FIG. 3 shows the selection and processing of tiles. From the first image, and from a corresponding location on the second image a 64×64 pixel region (30) is selected, as shown in FIG. 3a The tiles are then up-sampled by a linear factor 4 to minimise edge wrapping effects in subsequent processing, to produce tiles of size 256×256 pixels, described in FIG. 4 at step (42). The expanded tile from the first image is then masked, the mask comprising a 256×256 array, with the centre 40×40 pixels comprising ones, with the remainder of the mask comprising zeros. The expanded tile (from the first image) is multiplied by the mask, to leave the image data in the central 40×40 pixels (32), with zeros elsewhere (33). The expanded and masked tile (31) as shown in FIG. 3b is termed $t_1$.

The corresponding tile (34) from the second image, centred at the same point in terms of its x and y coordinate location within the image, and upsampled by a linear factor 4 as described above is shown in FIG. 3c. This expanded tile, termed $t_2$, does not have a mask applied.

A correlation is now performed on the processed tiles $t_1$ and $t_2$ as shown in FIG. 4 at step (43). The correlation therefore correlates the masked area (32) of $t_1$ with the whole (34) of the area of $t_2$. The correlation used is based upon the standard Fourier transform correlation $$C(x, y) = FFT^{-1}(FFT(x) \times FFT(y)^*) \qquad \text{Eqn. 1}$$

(where FFT denotes a discrete Fourier transform (a Fast Fourier transform in this case), and the * operator denotes the complex conjugate) but modified to add local normalisation as follows:

$$C(t_1, t_2)_{local} = \frac{C(t_1, t_2)}{\sqrt{C(|t_2|^2, m) \sum |t_1|^2}} \qquad \text{Eqn. 2}$$

The result of this correlation process is a correlation value (between 0 and 1) that provides a measure of how similar the tiles $t_1$ and $t_2$ are to each other as a function of relative x and y shifts. The correlation peak will therefore be dx and dy values at which the masked area of tile $t_1$ provides provides best alignment with $t_2$.

This local correlation is performed for each of the tile pairs, and so a range of correlation peak values, one for each tile pair, along with their respective dx and dy shifts is obtained. If a correlation peak value is less than a predetermined threshold then it, and its associated dx and dy values, is rejected. This is to prevent tiles that contain "noisy" image data from having an undue influence on the outcome of the alignment process. The threshold used in an embodiment of the present invention is 0.65, although other values may be chosen. Decreasing this threshold value will result in the noisier tiles being used, which will tend to decrease accuracy of the the overall image alignment, while increasing it will reduce the number of tiles that are to produce the final alignment, which may again decrease the accuracy of the overall image alignment. The best threshold value may therefore be obtained by trial and error on representative images.

The set of dx and dy values from those tiles whose correlations are above the threshold are then used to generate values (44) for shift, shear and stretch to be applied to the first image, so as to best bring it into alignment with the second. Of course, values may equally be applied to the second image to bring it into line with the first.

An embodiment of the invention uses a model to generate values for shift, shear and stretch to be applied to one of the images. The model used is:

$$\delta_x(x,y) = Ay + Bx + C$$

$$\delta_x(x,y) = A'y + B'x + C'$$

where x and y are the centre positions of each of the tiles, and
A defines a shear—an x shift as a function of y;
B defines a stretch—an x shift as a function of x;
B' defines a shear, a y shift as a function of x;
A' defines a stretch—a y shift as a function of y;
C and C' define shifts in x and y respectively.

The results of the correlations performed on each of the tiles provide an array of data:

$(x_1, x_2, x_3, \ldots, x_N)$ $(y_1, y_2, y_3, \ldots, y_N)$ $(dx_1, dx_2, \ldots, dx_N)$ $(dy_1, dy_2, \ldots, dy_N)$ for tiles $1, \ldots, N$ where $x_n$ and $y_n$ are the tile centre positions, and $dx_n$ and $dy_n$ are the individual tile correlation shifts that provide a correlation peak. A standard least squares approach is then used to estimate the values A, B, C, A', B' and C'

The least squares fitting is iterated as follows, to produce a fit that is less dependent on data outliers that have a tendency to skew the fit. A first estimate is done, and the error between the individual data points and the fit is calculated. If this error exceeds a predetermined threshold, then the data point is removed and the least squares method is again applied, using the reduced data set. This continues until all data points are within the threshold.

The final values for A, B, C, A', B' and C' are then applied (45) to the first image, to bring it into better alignment with the second. Phase corrections may be applied to account for any range shear adjustments that are made to the image, as these adjustments create a phase error between the first and second images.

FIG. 5 shows a graph of the number of floating point operations required to carry out image alignment according to an embodiment of the present invention, versus the size of the image in pixels. It will be appreciated by those of ordinary skill in the art that the processing effort required is considerably less than that used by techniques that do not use the tiling approach of the present invention, but which instead process the whole image.

The invention may be implemented in a computer system comprising a processor and memory. The computer system may have a display for displaying images, or data pertaining to images or other data. The invention may be arranged to implemented as a set of steps operative on the computer system, with the steps being coded in the form of a computer program. The invention therefore extends to a computer program, which may reside on a carrier, designed to implement the method of the invention when loaded onto a suitable computer system.

The invention claimed is:

1. A method for precisely aligning images of a scene, the images being complex images containing both magnitude and phase information, and comprising a first image and a second image of a region, the method comprising the steps of:
    a) dividing the first image into a plurality of tiles, the sum total area of the tiles being less than the area of the first image;
    b) dividing the second image into a plurality of tiles, each tile corresponding in position to a tile of the first image;
    c) up-sampling each of the tiles to increase the effective tile resolution;
    d) for each up-sampled tile in the first image, determining, using a complex FFT correlation algorithm, an offset in x and y between it and the corresponding up-sampled tile from the second image, the up-sampled first and second images together constituting a tile pair, and the offset being one that maximises a complex correlation between the two tiles;
    e) using the offsets calculated to produce overall image movement parameters for the second image; and
    f) applying the overall image movement parameters to the second image, thereby aligning it with the first image;
    wherein the FFT based correlation normalizes the amplitudes of each of the tiles in the first image with the corresponding tile from the second image, the normalization being local to each tile area, and wherein the normalization applied is $$\frac{1}{\sqrt{C(|t_2|^2, m) \sum |t_1|^2}},$$

where $t_1$ and $t_2$ constitute the first and second up-sampled tiles, C denotes the correlation function, and m denotes the masking function.

2. A method as claimed in claim 1 wherein the movement parameters comprise at least one of shift, shear and stretch.

3. A method as claimed in claim 1 wherein the total tile area is less than 10%, or less than 1%, or less than 0.1% of the image area.

4. A method as claimed in claim 1 wherein the tile positions comprise a uniform grid on the first and second images.

5. A method as claimed in claim 1 wherein each of the tiles is up-sampled before the correlation step to increase its resolution.

6. A method as claimed in claim 1 wherein a portion of one of the tiles in each tile pair is masked off before the correlation step is performed.

7. A method as claimed in claim 1 wherein in step (d) the correlation value associated with each tile pair is compared to a predetermined threshold, and the x and y offset values from that correlation used in subsequent processing only if the threshold is reached.

8. A method as claimed in claim 1 wherein a least squares model is used to produce the overall image parameters using the x and y values from step (d).

9. A method as claimed in claim 8 wherein, where a difference between an x, y data point and the least squares model exceeds a predetermined threshold, that point is discarded and the least squares model recalculated using remaining data.

10. A non-transitory computer-readable medium containing computer instructions arranged to run on a computer system, the system comprising at least a processor and memory, the steps of the computer instructions being arranged to process data corresponding to first and second complex images of a region, by
    a) dividing the first image into a plurality of tiles, the sum total area of the tiles being less than the area of the first image;
    b) dividing the second image into a plurality of tiles, each tile corresponding in position to a tile of the first image;
    c) up-sampling each of the tiles to increase the effective tile resolution;
    d) for each up-sampled tile in the first image, determining, using a complex FFT correlation algorithm, an offset in x and y between it and the corresponding up-sampled tile from the second image, the up-sampled first and second images together constituting a tile pair, and the offset being one that maximises a complex correlation between the two tiles;
    e) using the offsets calculated to produce overall image movement parameters for the second image; and
    f) applying the overall image movement parameters to the second image, thereby aligning it with the first image,
    wherein the FFT based correlation normalizes the amplitudes of each of the tiles in the first image with the corresponding tile from the second image, the normalization being local to each tile area, and wherein the normalization applied is $$\frac{1}{\sqrt{C(|t_2|^2, m)\sum |t_1|^2}},$$

where $t_1$ and $t_2$ constitute the first and second up-sampled tiles, C denotes the correlation function, and m denotes the masking function.

11. A program as claimed in claim 10 wherein the program is arranged to use a least squares model to produce the overall image parameters in step (e) using the x and y values from step (d).

* * * * *